John S. Crane's Improved Button hole Cutter

No. 74315

**PATENTED
FEB 11 1868**

Witnesses
C. P. S. Wardwell
John Aldrich

John S. Crane

United States Patent Office.

JOHN S. CRANE, OF LAKE VILLAGE, NEW HAMPSHIRE.

*Letters Patent No. 74,315, dated February 11, 1868.*

IMPROVEMENT IN BUTTON-HOLE CUTTERS.

The Schedule referred to in these Letters Patent and making part of the same.

TO ALL WHOM IT MAY CONCERN:

Be it known that I, JOHN S. CRANE, of Lake Village, in the county of Belknap, and State of New Hampshire, have invented a new and useful Improvement in Button-Hole Cutters; and I do hereby declare that the following is a full and exact description thereof, reference being had to the accompanying drawings, and to the letters of reference marked thereon.

The nature of my invention consists in arranging two cutters or blades and a punch in such a manner that the cutters can be adjusted in relation to each other, so as to make an incision in the cloth of any length required for a button-hole.

To enable others skilled in the art to make and use my invention, I will proceed to describe its construction and operation.

Figure 1:
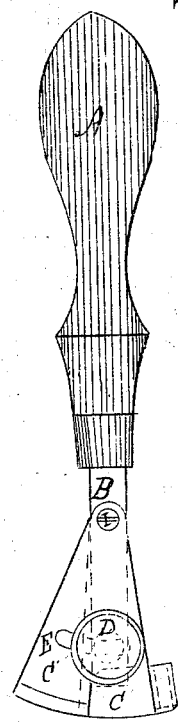
Figure 2:
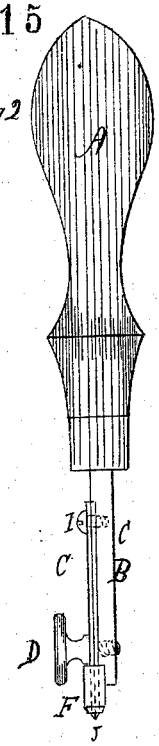
Figure 3:
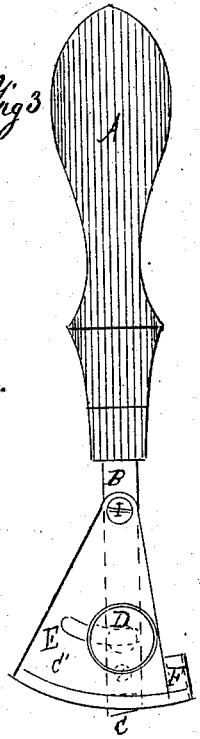

Figure 1 is a side view.
Figure 2 is an edge view.
Figure 3 is a view of a modification of the same principle.

A is a handle; B, a shank attached to the handle in any convenient manner. C C' are two cutters, attached to shank B by means of screw I and thumb-screw D, which pass, through both plates or cutters, into shank B. The inside cutter, C, has a punch, F, attached to it at one end, which is substantially like the punches used for like purposes.

The cutting-edges of both cutters C C' are arcs of a circle, with its centre at screw I, on which the outer cutter, C', turns, and is adjusted to the required position by means of the slot E and thumb-screw D, which hold both plates firmly in position. This means of adjustment of cutter C' in relation to cutter C presents a long or short arc or cutting-edge, as may be required, for cutting a button-hole. These cutters are chamfered on their outer sides only, to bring them to a cutting-edge, so that, where the two cutting-edges lap past each other, they operate like a single cutting-edge, as seen at J, fig. 2. Cutter C' has a corner cut out of its plate, next to the punch F, so as to allow the cutting-edges of both cutters to be brought side by side their entire length, for the purpose of cutting the shortest button-hole it is capable of cutting. When so adjusted, both cutters operate their entire length like a single cutter.

C', fig. 3, is a cutter with a punch, F, attached to it. This cutter is attached to shank B by screw I, on which it turns, and is adjustable in relation to shank B by means of slot E and thumb-screw D, which holds it firmly in place. The cutting-edge is the arc of a circle, with its centre at screw I. Shank B terminates at red dotted line near the cutting-edge of cutter C', and has a cutter, C, attached to it, one corner of which projects below the edge of plate C'. The end of shank B operates as a stop to regulate the depth of the cut at that point, so that that portion of cutter C' which is at the left of cutter C shall not act upon the material which is being cut by the punch and such parts of both cutters C and C' as are between the punch and the long corner of cutter C. The length of the button-hole to be cut is, therefore, governed by the relative position of cutter C in relation to cutter C' and the eye-punch. These cutters are also chamfered on their outer sides only, same as those first described. The object of cutter C in this plan is to make a square cut through the material operated on at that end of the button-hole, instead of terminating the cut obliquely to the surface of the material, as would be the case were the cutter C left off.

The principle of this button-hole cutter may be farther modified as follows, viz: The cutting-edges of both cutters may be straight, and set at a right angle to shank B, and thus present a straight cutting-edge, in which case screw I is dispensed with, and both cutting-plates may be much shorter, and their upper edges to be parallel to the cutting-edges, and rest against a shoulder on the shank B, to prevent their turning on thumb-screw D.

The operation is as follows: Having adjusted the cutters as desired, force the punch vertically through the material to be cut. Then continue the pressure, and roll the cutters along their edge till the cutting is completed.

In case the last-named modification is preferred, it will perhaps be preferable to force it through the material to be cut by a blow. The end of a block of wood is preferable to place the material on to be cut.

What I claim as my invention, and desire to secure by Letters Patent, is—

The combination of cutters C and C', constructed and operating substantially in the manner and for the purpose set forth.

JOHN S. CRANE.

Witnesses:
C. P. S. WARDWELL,
JOHN ALDRICH.